Figure 1:
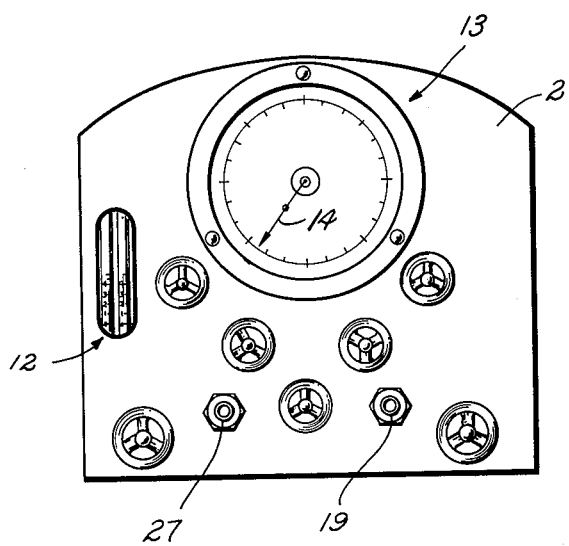

July 26, 1966 J. S. DAWLEY 3,262,305
METHOD AND APPARATUS FOR CALIBRATING
DIFFERENTIAL PRESSURE CELLS
Filed March 11, 1964 2 Sheets-Sheet 1

INVENTOR.
JACK S. DAWLEY
BY
ATTORNEYS

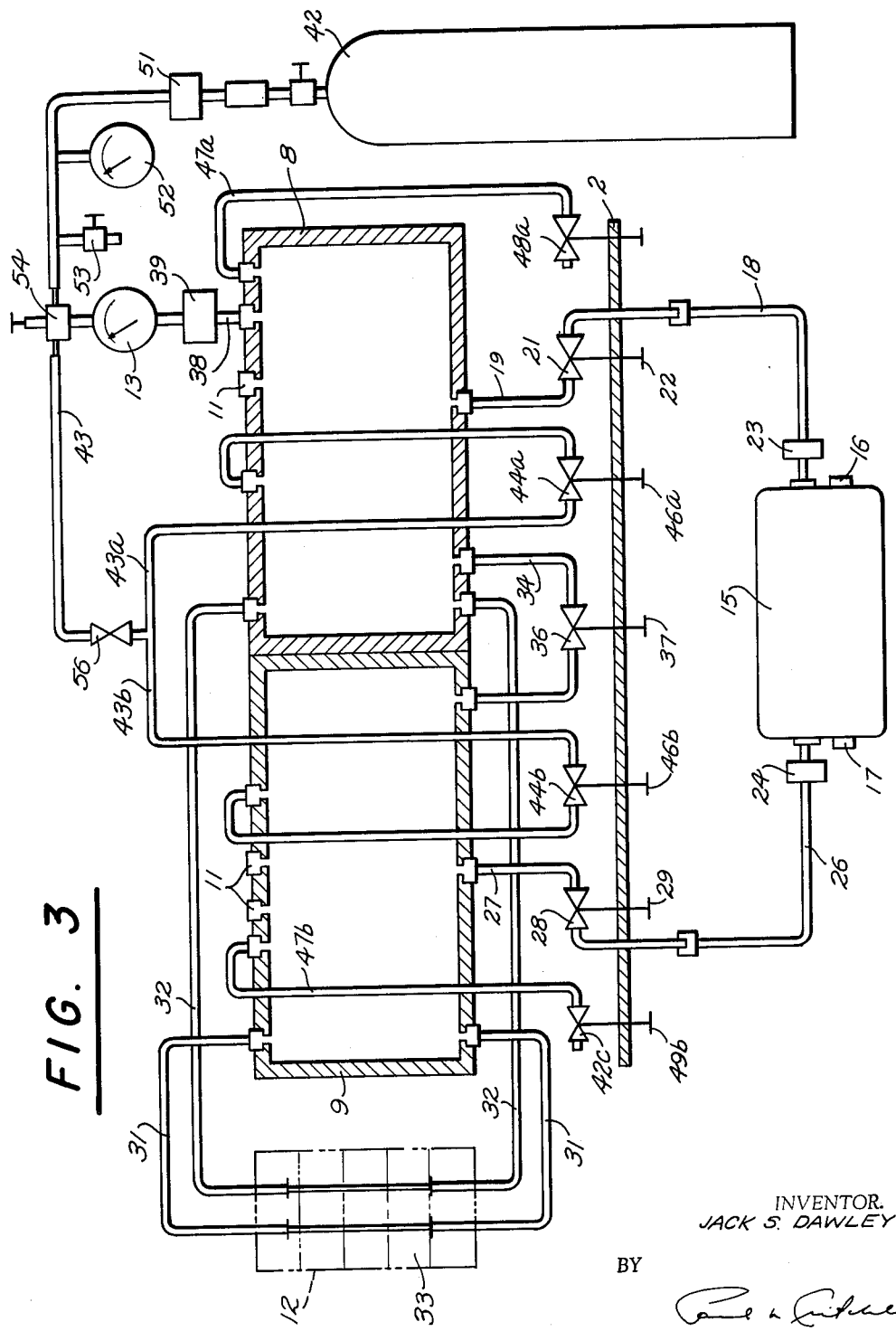

United States Patent Office 3,262,305
Patented July 26, 1966

3,262,305
METHOD AND APPARATUS FOR CALIBRATING DIFFERENTIAL PRESSURE CELLS
Jack S. Dawley, 2132 Mayfair Drive, Napa, Calif.
Filed Mar. 11, 1964, Ser. No. 351,257
7 Claims. (Cl. 73—4)

The invention described herein may be manufactured and used by or for the Government of the United States of America for governmental purposes without the payment of any royalties thereon or therefor.

The present invention relates to a method and apparatus for checking or calibrating differential pressure cells, such as differential pressure transmitters, switches, water-level gauges, differential pressure gauges and other similar instruments.

As already indicated, the term differential pressure cell is used generically to include such well known mechanisms as differential pressure gauges, switches, transmitters, etc. which, as is known, frequently are employed in piping systems both for control purposes and as pressure check points. In systems such as nuclear propulsion plants, their accuracy is a crucial concern to the extent that periodic calibration is an essential part of plant maintenance.

Although calibration can be performed with conventional manometer test instruments, the use of such instruments is notoriously awkward and time consuming when their use is required in confined areas such as in a below-deck area of a submarine. For example, nuclear submarine propulsion gauges or cells of the type used in plants must be responsive to pressure differentials up to 400 inches of water so that a manometer having a comparably long water column conventionally has been required. If mercury tubes were permissible, the size of the tube could be reduced, but, as may be known the use of mercury aboard nuclear submarines is not permitted.

Obviously, the long U-tube manometer cannot be taken below deck or even brought into the immediate vicinity of the instrument being tested. Thus, testing, for the most part, has been limited to laboratory checks or dock side maintenance and even in their environment, the procedures are difficult and frequently inaccurate. Long extension lines must be used to couple the cell to the manometer. Also, the calibration reading may be awkward and inexact particularly if, as in some cases, the reading requires the use of a step ladder to elevate the operator to the height of the column.

It is, therefore, one object of the present invention to provide apparatus for testing differential pressure cells, the apparatus being small, compact, and sufficiently portable to be used in close proximity to the instruments to be checked.

Another object is to provide a more accurate method and apparatus for testing pressure cells and the like.

Yet another object is to provide apparatus capable of being used for testing differential pressure mechanisms employed in the primary and secondary systems of nuclear propulsion plants.

Still a further object is to provide a method and apparatus for testing a wide variety of low pressure cells of the type having a low and a high pressure side partitioned by a pressure-responsive diaphragm or similar mechanisms.

Other objects and attendant advantages of the present method and apparatus will become more apparent in the ensuing detailed description.

The apparatus of the present invention is characterized by the use of a pair of closed water tanks filled to a pre-determined level with water or other suitable liquid and coupled each to opposite sides of the differential pressure cells to be tested, i.e. one of the tanks to the high side of the cell and the other to the low side. As will be appreciated, the liquid in the tanks provides pressure heads acting on the opposite side of the cell and, as another significant feature, these heads may be varied by air or gas pressure admitted into each of the tanks. A precision gauge is communicated with at least one of the tanks in such a manner that a variation of the liquid head produced by increasing the gas or air pressure is indicated directly on the precision gauge.

As a further important feature, the tanks and all of the valve structure essential to the calibration procedure are mounted in a relatively small box frame which is of such a size that it can be carried below deck in, for example, a submarine. A special arrangement of the various elements permits achievement of the small size and, as also will become apparent, the arrangement promotes accuracy.

A feature of the method, as well as the apparatus, is the fact that the gas or air pressure is used, not only to increase or decrease the pressure differential in direct proportion to the reading of the precision gauge, but also to initially fill and vent the gauge to be tested so as to assure a solid water head which, of course, is essential for accurate readings.

Figure 2:
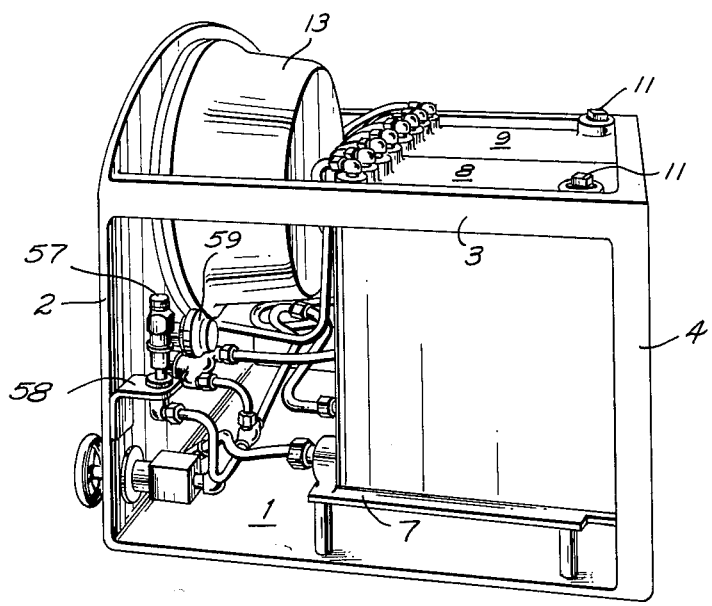

A preferred embodiment of the invention is illustrated in the accompanying drawing of which:

FIG. 1 is a front elevation of the apparatus;
FIG. 2 is a perspective of the apparatus as viewed from the rear, this view primarily showing the arrangement of the structural elements as opposed to the internal piping and structure, and
FIG. 3 is a schematic illustration showing the arrangement of the piping, valves and other elements of the fluid circuitry.

Referring first to FIGS. 1 and 2 of the drawings, it will be noted that the functional elements all are contained in a box-like structure formed of a base 1, a front instrument panel 2, and side and rear frame members 3, 4 and 6. Base 1 supports a platform 7 on its rearward portion and the platform, in turn, mounts a pair of tanks 8 and 9, these tanks, preferably, being rectangular in shape and disposed in close proximity one to the other. Each tank has a fill plug 11 by means of which water or other suitable liquid can be initially admitted or replenished as the need may be. Although ordinary water may be employed, it is preferred to use a deionized pure water if the test apparatus is to be used for checking the accuracy of the gauges and other differential pressure devices of a nuclear propulsion system. Obviously, the maintenance of grade "A" cleanliness of such systems is essential and the pure water, of course, is to avoid contamination. Also, the tanks, as well as other structural members, most suitably, are formed of a light metal such as aluminum, to facilitate portability. The top and bottom portions of each tank are formed with appropriate fittings to permit the coupling of certain fluid conduits which will be described in detail.

FIG. 1 illustrates the front instrument panel of the apparatus which, as will become apparent, is formed in a special manner to promote overall small size and compactness as well as to facilitate the use of the apparatus and improve its accuracy. Although the details of this arrangement will be considered later it presently can be noted that panel 2 includes two openings one of which mounts a 12 sight glass mechanism while the other mounts a special precision gauge 13.

Pressure gauge 13 is a commercially-obtainable item characterized by the fact that it is precision-graduated 1–1000 parts correct full scale at 25° C. The gauge may be of a type which is responsive to air or gas pressure to drive a pointer 14 in a circular path over graduated indices which represent inches of water. Different scales may be used for different purposes, the scale illustrated being graduated in a range from 0 to 400 inches of water. Such a scale provides a convenience when the differential pressure cell also measures inches of water. Other scales, such as pounds per square inch can be employed or conversions can be made from pounds per square inch to inches of water, i.e. one p.s.i. is equal to 27.7 inches.

FIG. 3 illustrates the fluid circuitry components of the test apparatus. This figure also should be helpful in understanding the special arrangement of the components which permits small size, portability and accurate usage. One aspect especially to be noted is that tanks 8 and 9 are shown in elevation while instrument panel 2 is shown in plan, this distortion being employed to facilitate understanding of the general layout of the piping and its associated valves and valve operating mechanisms.

The apparatus, as shown in FIG. 3, is being used for calibrating a differential pressure cell, generally identified by numeral 15, although the showing of cell 15 is schematic and not intended to illustrate any particular mechanism. It could be a standard differential pressure gauge having a direct readout or it could be one of the differential pressure transmitters of the type utilizing an induction coil or the like to provide a voltage readout at a remote location. Other mechanisms, capable of being calibrated by the present apparatus, include pressure-responsive switches which should be extremely accurate for close control and protection for the system, or other devices such as water level gauges. Generally, each of these mechanisms are characterized by the fact that it has a high pressure side and a low pressure one, the two sides being separated by a diaphragm or other equivalent means responsive to pressure differential between the high and low sides to drive some form of read-out. Customarily, such devices either have vents for both the high and low sides or they are provided with internal or external passageways so that the fluid, if desired, can be passed through the mechanism. In the illustrated cell, the high side is provided with a vent 16 and the low side with a similar vent 17.

The high side of cell 15 is communicated with the water of tank 8 by means of Koroseal tubing 18 and a water line 19 in which is mounted a needle vent valve 21 manually operated by a valve control wheel and shaft 22. If need be, cell 15 also can be provided with a special adaptor 23 for coupling tubing 18. In a similar manner, the low side of the cell may have an adaptor 24 coupled to a flexible tubing 26 which, in turn, couples to a water line 27 that communicates the low side with the water of tank 9. Another needle valve 28 is mounted in line 27 and this valve also is manually controlled by a valve wheel and shaft 29.

Previously mentioned sight glass mechanism 12, which is carried at the left-hand side of instrument panel 2, is employed to sight the water levels of each tank to permit the water levels to be equalized to provide an equal water head on each side of differential pressure cell 15. For this purpose, each of the water tanks has its top and bottom portions intercommunicated by conduits 31 and 32, both of these conduits including vertically-extending portions disposed side by side and formed of a transparent substance such as glass or plastic to permit the water level to be viewed. A plate 33 is mounted in the panel behind the transparent portions of the conduit and the plate is divided into graduations representative of liquid level heights. To complete the hydraulic circuitry, the bottoms of each of the tanks are intercommunicated by a by-pass conduit 34 having a needle valve 36 operated by a valve wheel and shaft 37. The rather obvious purpose of the by-pass is to permit the water levels of the tanks to be equalized.

Previously mentioned precision gauge 13 communicates with the upper portion of tank 8 which, as already explained, has its water head communicated with the high side of differential pressure cell 15. An air pressure line or conduit 38 is used to couple the pressure gauge and, most suitably, a moisture filter 39 is disposed in line 38 to assure that all moisture is kept out of the gauge. Filter 39 may be made of plastic and filled with an appropriate dessicant. For some calibration operations, it may be desirable to use a pair of precision gauges 13, i.e. one gauge for each of the tanks. To permit the coupling of the additional pressure gauge, tank 9 is provided with a fitting 41.

Pressure for actuating the gauge 13 and for increasing the static water-head on the differential pressure cell is provided by a nitrogen tank 42 coupled to the top portions of both of the tanks. More specifically, the coupling includes a common line or conduit 43 which branches into line 43a and 43b that, in turn, lead into the tanks in the manner shown. For control purposes, each of lines 43a and 43b mount needle valves 44a and 4b, these valves being manually controlled by valve wheels and shafts 46a and 46b. Also, each of the tanks is vented by conduits 47a and 47b and each of these conduits mounts needle valves 48a and 48b similarly controlled by mechanisms 49a and 49b.

It also is desirable in performing the calibrations to positively control the pressure applied to the tanks particularly during the phase of the calibration which includes an initial venting of the differential pressure cell. For example, the maximum pressure should be regulated to about 50% of the cell's label-plate-rated differential pressure plus or minus the water-head so as to prevent any cell damage. For this purpose, common line 43 includes a suitable regulator 51, a 0–30 p.s.i. gauge 52, a vent 53, a manually-operated needle valve 54, and an isolation valve 56. It further may be noted at this point that common line 43 may be a relatively long flexible nitrogen line which, when the calibration is to be performed, is coupled to a fitting 57 carried on an angle flange 58 which, in turn, is bolted to the rear face of instrument panel 2. Fitting 57 carries a wheel 59 for operating isolation valve 56.

Certain aspects of the structural and fluid circuitry arrangement are significant factors in promoting the essential small size of the apparatus. For example, it is to be noted that all of the valve wheels and shafts are mounted on instrument panel 2 and that the hydraulic and pneumatic piping or conduits, including all of the needle valves incorporated into the conduits and operated by the valve wheels, are brought into close proximity with the rear portion of instrument panel 2 to minimize, as much as possible, the length of the valve operating shafts. Also, as previously stated, sight glass mechanism 12 is carried at the left side (FIG. 1) of the panel so as to be readily viewable as by-pass valve 36 is operated to equalize the water levels of the tank.

Further, it is most desirable to so dispose water conduits 19 and 27 as to have short lengths of these conduits projecting outwardly through the instrument panel in the manner shown in FIG. 1. The purpose of these extensions is to permit the apparatus to be carried below deck where it then may be coupled to Koroseal tubings 18 and 26 which, in turn, are lead into the high and low sides of differential pressure valve.

To calibrate a differential pressure cell, the described apparatus may be carried into proximity with the cell where it then is coupled to the cell by means of the Koroseal tubing. Also, nitrogen tank 2 may be separately transported to the desired location where it is coupled to fitting 27 of the apparatus. Depending upon the particular job to be accomplished, precision gauges of different types may be employed, although the principal difference usually would be one of scale only. To permit substitution of the gauges, it should be noted that the gauges are detachably mounted on instrument panel 2.

The first step in calibrating a differential pressure cell is to fill and vent the cells in such a manner that a solid water-head, free of any signs of air or gas bubbles, is provided between the tanks and the different sides of the cell. In performing this filling and venting operation, it is important to regulate the amount of air or gas pressure supplied to the tanks and, as previously indicated, the regulation preferably is one of limiting the nitrogen pressure to 50% of the permissible rated differential pressure as modified by the water level.

With all of the valves closed, the first step is to open by-pass valve 36 to equalize the water level in the tanks. Next, vent plugs 16 and 17 of differential pressure cell 15 may be removed and isolation valve 56 in the nitrogen supply line opened. To vent the high side of the differential pressure cell, valve 21 of its water line is opened and then needle valve 44a in the nitrogen supply line gradually is opened. In this operation, it is desirable to use the gas or air pressure to control the water flow and the calibrating pressure in the manner previously stated. After opening valve 44a, water is allowed to fill the high leg chamber of the differential pressure cell until it flows from its vent freely and without any signs of air bubbles. When this occurs, vent plug 16 is replaced. At this point a solid water-head is assured in water lines 18 and 19.

The low leg side of the differential pressure cell also is filled and vented in a precisely similar manner which, it is believed, should be reasonably apparent without detailed description.

Following the filling and venting of the cells, it is necessary to assure that the water level between the tanks is precisely the same and, if need be, gas pressure may be utilized to control the levels. After the tank levels are equalized, by-pass valve 36 is closed and the cell now is properly vented so that calibration may proceed.

The calibration itself is accomplished in a manner which should be relatively obvious, although procedures may differ depending upon the cell being calibrated. Generally, gas pressure is applied to tank 8 under the control of valve 44a and, since this pressure is communicated with precision gauge 13, the pointer of 13 will precisely indicate the amount of pressure added to the solid water head on the high side of the differential pressure cell. The accuracy of the differential pressure cell is determined by checking its read-out with the pressure indicated on the precision gauge.

In some applications, it may be desirable to obtain pressure cell read-outs by also applying gas pressure to tank 9 and, in this instance, another precision gauge 13 may be coupled to fitting 11 of this tank. If the pressure cell is a mechanism operating at a particular differential pressure, such as a pressure switch, the calibration may be conducted to determine whether or not switch operations occur at the proper point. It is believed that calibration of other types of differential pressure mechanisms would be relatively obvious to those familiar with the art.

In general, the particular advantages of the apparatus reside in its accuracy and its relatively small size and portability. The accuracy is limited only to the precision of gauge 13 which should be found entirely adequate for calibration purposes. The small size of the apparatus is achieved by the general structural and circuit layout which has been described and its obvious advantage is that of permitting the apparatus to be used aboard ships. The entire apparatus replaces the more conventional and extremely cumbersome U-tubes.

Obviously many modifications and variations of the present invention are possible in the light of the above teachings. It is therefore to be understood that within the scope of the appended claims the invention may be practiced otherwise than as specifically described.

What is claimed is:

1. Apparatus for calibrating differential pressure cells having high and low pressure sides, comprising:
   a box frame having a front wall formed as an instrument panel,
   a pair of closed water tanks disposed rearwardly of said box frame in close proximity one to the other,
   fill means for each tank,
   pressure conduits for communicating each tank with a gaseous pressure source,
   a valve for each pressure conduit,
   means for venting each tank,
   a water-by-pass conduit inter-communicating said tanks,
   a valve for said by-pass conduit,
   water level indicating means for each tank,
   a precision fluid pressure gauge having graduated indices representing inches of water,
   a conduit communicating said precision gauge with the upper portion of one of said tanks,
   water lines coupled to the lower portion of each tank and projecting outwardly a short distance through said instrument panel,
   a valve for each of said water lines, and
   valve control means for each of the aforementioned valves,
   said valves all being disposed proximate to the inner face of said instrument panel and said valve control means each being mounted in and projecting outwardly of the panel,
   whereby said water line projections may be coupled one to the high and the other to the low side of a differential pressure cell and air pressure supplied to the gauge-coupled tank for calibrating the cell by varying its differential pressure in direct ratio with the precision gauged air pressure, 2. The apparatus of claim 1 wherein the indices of said pressure gauge represent 0–400 inches of water.

3. Apparatus for calibrating differential pressure cells having high and low pressure sides, comprising:
   a box frame having a front wall formed as an instrument panel,
   a pair of closed water tanks disposed rearwardly of said box frame in closed proximity one to the other,
   fill means for each tank,
   pressure conduits for communicating each tank with a gaseous pressure,
   a valve for each pressure conduit,
   means for venting each tank,
   a water by-pass conduit inter-communicating said tanks,
   a valve for said by-pass conduit,
   water level indicating means for each tank,
   a precision fluid pressure gauge having graduated indices representing inches of water,
   a conduit communicating said precision gauge with the upper portion of one of said tanks,
   a fitting on the other tank whereby a second precision gauge may be coupled to said other tank,
   water lines coupled to the lower portion of each tank and projecting outwardly a short distance through said instrument panel,
   a valve for each of said water lines, and
   valve control means for each of the aforementioned valves,
   said valves all being disposed proximate to the inner face of said instrument panel and said valve control means each being mounted in and projecting outwardly of the panel,
   whereby said water line projections may be coupled one to the high and the other to the low side of a differential pressure cell and air pressure supplied to the gauge-coupled tank for calibrating the cell by varying its differential pressure in direct ratio with the precision gauged air pressure.

4. The apparatus of claim 3 further including a moisture filter coupled into said precision gauge conduit.

5. Apparatus for calibrating differential pressure cells having high and low pressure sides comprising:
   a box frame having a front wall formed as an instrument panel,
   a pair of closed water tanks disposed rearwardly of said box frame in close proximity one to the other, fill means for each tank,
pressure conduits for communicating each tank with a gaseous pressure source,
a valve for each pressure conduit,
means for venting each tank,
a water by-pass conduit inter-communicating said tanks,
a valve for said by-pass conduit,
water level indicating means for each tank,
a precision air pressure gauge having graduated indices representing inches of water.
a conduit communicating said precision gauge with the upper portion of one of said tanks,
a fitting on the other tank whereby a second precision gauge may be coupled to said other tank,
water lines coupled to the lower portion of each tank and projecting outwardly through said instrument panel a short distance,
a valve for each of said water lines,
valve control means for each of the aforementioned valves, and
flexible water conduit means for coupling the water line of the gauge coupled tank with the high side and a differential pressure cell and for coupling the water line of the other tank with its low side,
said valves all being disposed proximate to the inner face of said instrument panel and said valve control means each being mounted in and projecting outwardly of the panel,
whereby said cell can be calibrated by varying the differential pressure in direct ratio with the precision gauged air pressure.

6. A method of calibrating a differential pressure cell having high and low pressure sides comprising:
providing separate enclosed water heads one on the high side of the cell and the other on the low side,
successively applying gaseous fluid pressure to one of said enclosed heads and then to the other,
concurrently with said successive pressure applications successively venting one side of the cell and then the other for insuring solid air-free water heads,
then equalizing water pressure on both sides of the cell,
applying a controlled and gauged gaseous fluid pressure to the enclosed water head of said high side of the cell while venting the enclosed water head of said low side,
varying said applied gauged pressure, and
adjusting the differential pressure response of the cell to said varied pressure in conformity with said gauged pressure.

7. A method of calibrating a differential pressure cell having high and low pressure sides adapted to be coupled into a nuclear propulsion plant, comprising:
providing separate enclosed heads of deionized pure water one on the higher side of the cell and the other on the low side,
successively applying gas pressures to one of said enclosed heads and then to the other,
concurrently with said successive pressure applications successively venting one side of the cell and then the other for insuring solid air-free water heads,
then equalizing water pressure on both sides of the cell,
applying a controlled and gauged gas pressure to the enclosed water head of said high side of the cell while venting the enclosed water head of said low side,
varying said applied gauged pressure throughout the entire range of the differential pressure cell, and
adjusting the differential pressure response of the cell to said varied pressure in conformity with said gauged pressure.

References Cited by the Examiner
UNITED STATES PATENTS 2,337,171 12/1943 Winton _____ 73—4 X
3,077,102 2/1963 Greer et al. _____ 73—4

LOUIS R. PRINCE, *Primary Examiner.*

DAVID SCHONBERG, *Examiner.*

S. C. SWISHER, *Assistant Examiner.*